United States Patent
Dabak

(10) Patent No.: US 11,580,217 B2
(45) Date of Patent: Feb. 14, 2023

(54) IMPLEMENTING DEFERRED GUEST CALLS IN A HOST-BASED VIRTUAL MACHINE INTROSPECTION SYSTEM

(71) Applicant: VMWARE, INC., Palo Alto, CA (US)

(72) Inventor: Prasad Dabak, Pune (IN)

(73) Assignee: VMWARE, INC., Palo Alto, CA (US)

( * ) Notice: Subject to any disclaimer, the term of this patent is extended or adjusted under 35 U.S.C. 154(b) by 389 days.

(21) Appl. No.: 16/788,316

(22) Filed: Feb. 12, 2020

(65) Prior Publication Data

US 2021/0124825 A1    Apr. 29, 2021

(30) Foreign Application Priority Data

Oct. 25, 2019    (IN) .............................. 201941043466

(51) Int. Cl.
*G06F 21/54*    (2013.01)
*G06F 9/455*    (2018.01)

(52) U.S. Cl.
CPC .......... *G06F 21/54* (2013.01); *G06F 9/45558* (2013.01); *G06F 2009/45587* (2013.01); *G06F 2221/033* (2013.01)

(58) Field of Classification Search
CPC ...... G06F 9/455; G06F 21/54; G06F 9/45558; G06F 2009/45587; G06F 2221/033; G06F 9/45545; G06F 21/53; G06F 21/606
See application file for complete search history.

(56) References Cited

U.S. PATENT DOCUMENTS

| | | | |
|---|---|---|---|
| 9,892,256 B1* | 2/2018 | Lango | G06F 21/53 |
| 10,108,446 B1* | 10/2018 | Steinberg | G06F 12/109 |
| 10,191,861 B1* | 1/2019 | Steinberg | G06F 9/45558 |
| 10,447,728 B1* | 10/2019 | Steinberg | H04L 67/10 |
| 10,768,966 B1* | 9/2020 | Naenko | G06F 9/4812 |
| 10,846,117 B1* | 11/2020 | Steinberg | G06F 21/56 |
| 2009/0144510 A1* | 6/2009 | Wibling | G06F 12/109 |
| | | | 711/147 |
| 2010/0138685 A1* | 6/2010 | Kass | G06F 9/526 |
| | | | 714/2 |
| 2012/0185834 A1* | 7/2012 | Ohrstrom | G06F 9/45525 |
| | | | 717/148 |
| 2013/0133061 A1* | 5/2013 | Fainkichen | G06F 9/455 |
| | | | 726/15 |

* cited by examiner

*Primary Examiner* — Abu S Sholeman
(74) *Attorney, Agent, or Firm* — Su IP Consulting

(57) ABSTRACT

Example methods are provided for virtual machine introspection in which a guest monitoring mode (GMM) module monitors the execution of guest calls by an agent that resides in a virtual machine (VM). The GMM module sets a bit in bit mask that corresponds to a guest call that the agent needs to execute, and inserts an invisible breakpoint in the code of the guest call. If the GMM module detects that despite the setting of the bit in the bit mask, the agent does not complete the execution of the code (due to the invisible breakpoint not being triggered), then the GMM module considers this condition as a potential hijack of the VM by malicious code.

21 Claims, 3 Drawing Sheets

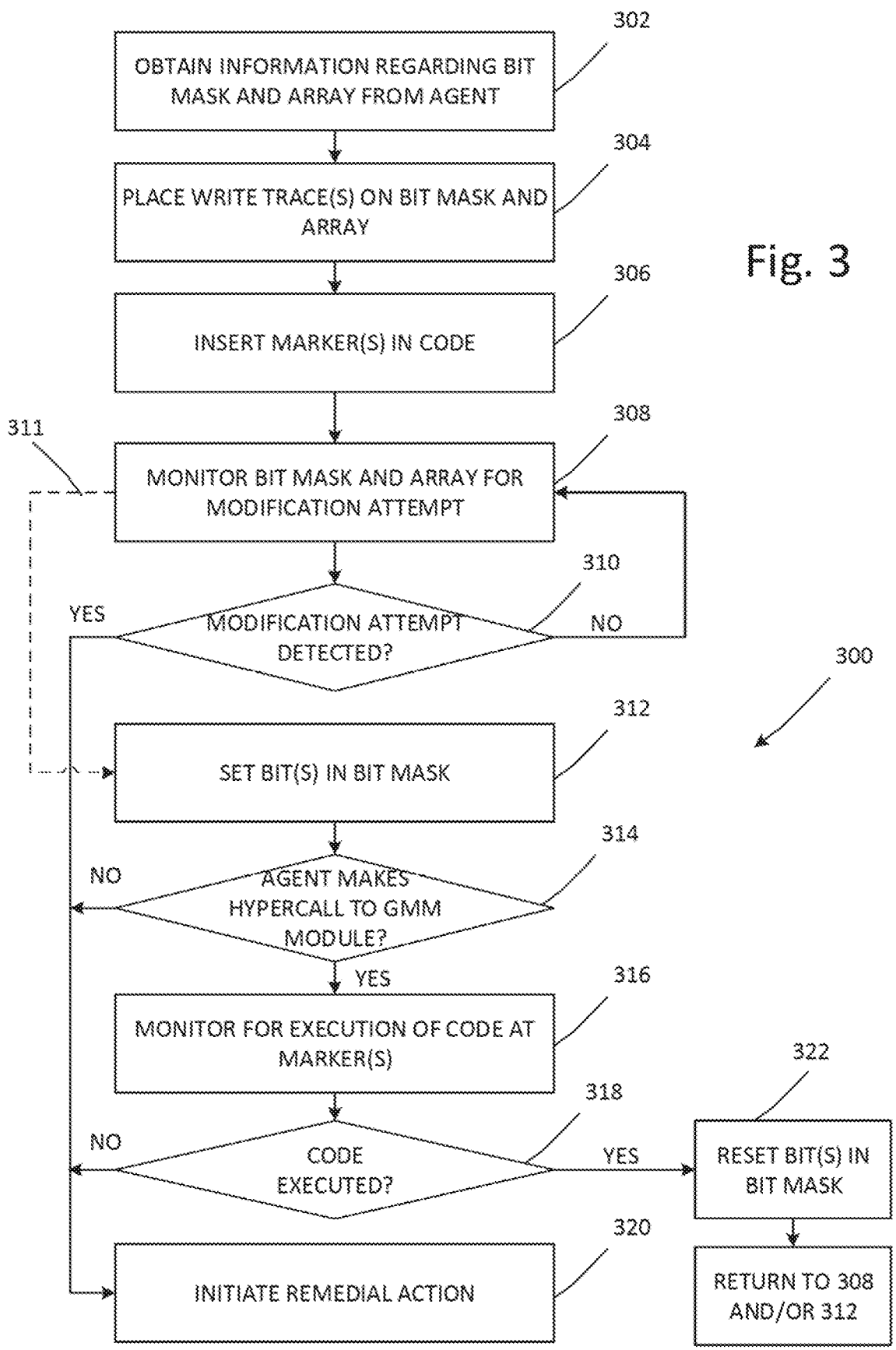

IMPLEMENTING DEFERRED GUEST CALLS IN A HOST-BASED VIRTUAL MACHINE INTROSPECTION SYSTEM

RELATED APPLICATIONS

Benefit is claimed under 35 U.S.C. 119(a)-(d) to Foreign Application Serial No. 201941043466 filed in India entitled "IMPLEMENTING DEFERRED GUEST CALLS IN A HOST-BASED VIRTUAL MACHINE INTROSPECTION SYSTEM", on Oct. 25, 2019, by VMware, Inc., which is herein incorporated in its entirety by reference for all purposes.

This application is related to the U.S. patent application Ser. No. 15/616,935 entitled "HYPERVISOR-ASSISTED APPROACH FOR LOCATING OPERATING SYSTEM DATA STRUCTURES BASED ON NOTIFICATION DATA" and U.S. patent application Ser. No. 15/643,503 "TRANSPARENT CODE PATCHING USING A HYPERVISOR", which are assigned to the assignee of this application and filed on the same day as this application and which are herein incorporated by reference in their entireties.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualization computing instances such as virtual machines (VMs) running different operating systems may be supported by the same physical machine (e.g., referred to as a host). Each virtual machine is generally provisioned with virtual resources to run an operating system and applications. The virtual resources may include central processing unit (CPU) resources, memory resources, storage resources, network resources, etc.

However, a virtualized computing environment having hosts that support VMs is often vulnerable to malware or other types of malicious code. To protect against such malicious code, virtualized computing environments typically implement some sort of defense mechanism. Nevertheless, defense mechanisms implemented in virtualized computing environments can sometimes be rendered ineffective or inefficient by malicious code.

BRIEF DESCRIPTION OF DRAWINGS

FIG. 3 is a flowchart of an example method for VMI that can be performed in the virtualized computing environment of FIG. 1.

DETAILED DESCRIPTION

Figure 1:
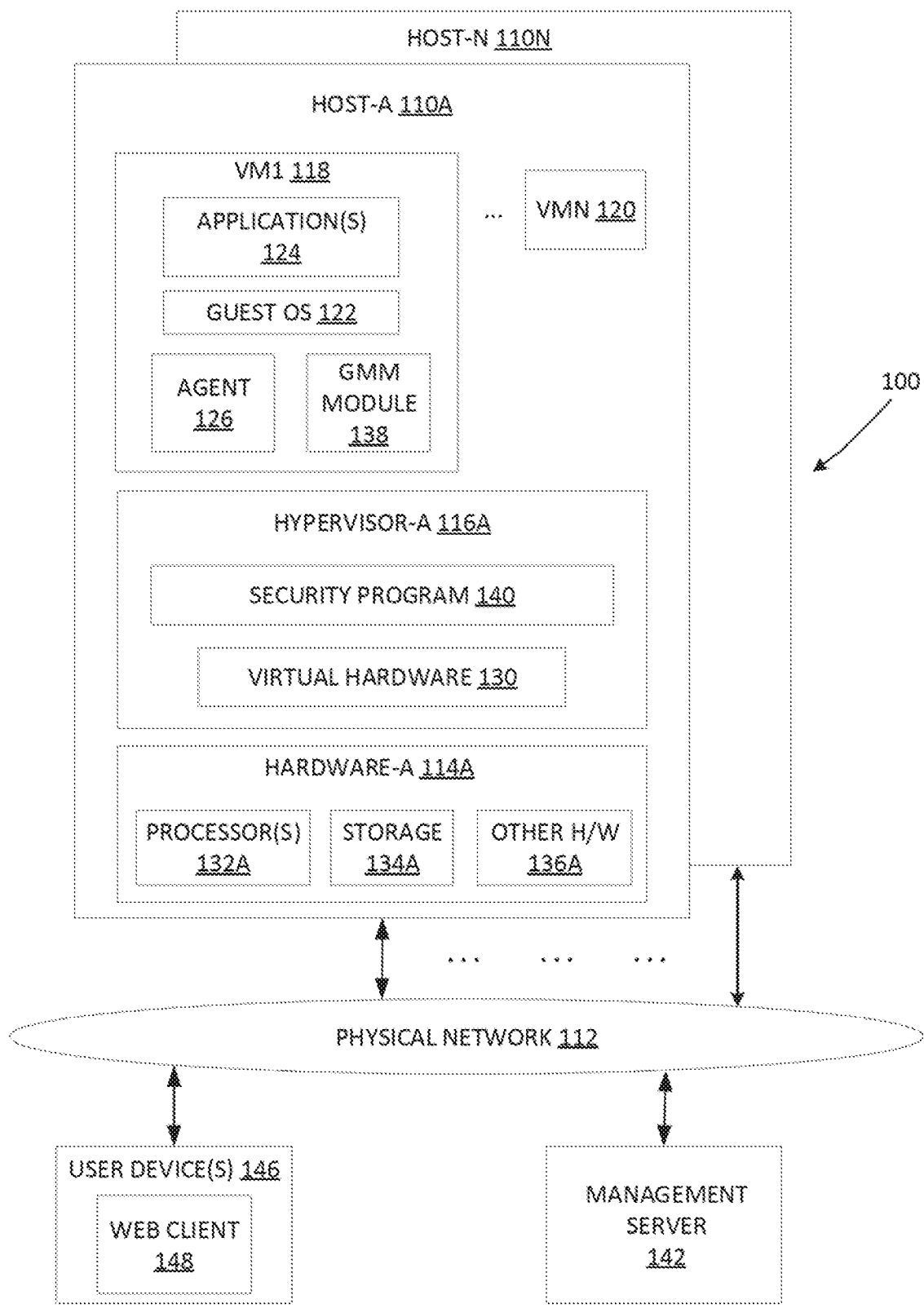
FIG. 1 is a schematic diagram illustrating an example virtualized computing environment in which virtual machine introspection (VMI) may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses potential drawbacks in defense systems for virtualized computing environments. For example in a virtualized computing environment that implements a virtual machine introspection (VMI) technique, a guest monitoring mode (GMM) module controls and monitors guest calls of an agent (guest agent) installed in a VM, so that the GMM is able to independently verify that the guest calls are indeed performed by the agent. The guest calls performed during the course of VMI may include operations directed towards monitoring processes, threads, states, or other aspects of the VM, for purposes of security, troubleshooting, debugging, etc. At times, the GMM module may want to dictate what the guest agent should do, and the GMM module may also need an independent verification that the guest agent indeed did what the GMM module has asked the guest agent to do. If the GMM module detects that the guest agent has not done or has otherwise not fully completed the operations instructed by the GMM module, then the GMM module may consider this condition as being indicative of a potential presence of malicious code (e.g., a hijack by the malicious code). The GMM module may then take an appropriate remedial action, such as shutting down the VM, suspending the VM, removing the VM from the network, alerting a management server operated by a system administrator to perform further investigation, or taking some other remedial action.

Computing Environment

To further explain the potential threats that may be caused by malicious code, as well as explaining the operations of the GMM module in conjunction with the agent to address such threats, various implementations will now be explained in more detail using FIG. 1, which is a schematic diagram illustrating an example virtualized computing environment 100 in which virtual machine introspection (VMI) may be performed. Depending on the desired implementation, virtualized computing environment 100 may include additional and/or alternative components than that shown in FIG. 1.

In the example in FIG. 1, the virtualized computing environment 100 includes multiple hosts, such as host-A 110A host-N 110N that may be inter-connected via a physical network 112, such as represented in FIG. 1 by interconnecting arrows between the physical network 112 and host-A 110A host-N 110N. Examples of the physical network 112 can include a wired network, a wireless network, the Internet, or other network types and also combinations of different networks and network types. For simplicity of explanation, the various components and features of the hosts will be described hereinafter in the context of host-A 110A. Each of the other host-N 110N can include substantially similar elements and features.

The host-A 110A includes suitable hardware 114A and virtualization software (e.g., hypervisor-A 116A) to support various virtual machines (VMs). For example, the host-A 110A supports VM1 118 . . . VMN 120. In practice, the virtualized computing environment 100 may include any number of hosts (also known as a computing devices, host computers, host devices, physical servers, server systems, physical machines, etc.), wherein each host may be supporting tens or hundreds of virtual machines. For the sake of simplicity, the details of only the single VM1 118 is shown and described herein.

VM1 118 may be a guest VM that includes a guest operating system (OS) 122 and one or more guest applications 124 (and their corresponding processes) that run on top of the guest operating system 122. VM1 118 may also include an agent 126 (guest agent). The agent 126 of various embodiments may be in the form of a kernel driver. The agent 126 may run as part of the guest OS 122. Further details of the features and use of the agent 126 will be described later below with respect to FIGS. 2-3.

The hypervisor 116A may be a software layer or component that supports the execution of multiple virtualized computing instances. The hypervisor 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the applications 124 (e.g., a word processing application, accounting software, a browser, etc.) in VM1 118. Corresponding to the hardware 114A, the virtual hardware 130 may include a virtual CPU, a virtual memory, a virtual disk, a virtual network interface controller (VNIC), etc.

In one embodiment, a guest monitoring mode (GMM) module 138 may reside in a secure memory space that is created in VM1 118 by the hypervisor-A 116A. The secure memory space of VM1 118 (for the GMM module 138) may be a region of memory in a guest memory address space of VM1 118 that is isolated from, and thus inaccessible by, other processes running in the VM1 118 (including privileged processes like the kernel of the guest OS 122). Thus, any code running in the GMM module 138 cannot be compromised via attacks within VM1 118, including attacks that target or otherwise maliciously modify the guest OS 122.

The GMM module 138 of one embodiment may be a software program or other computer-readable instructions/code, such as a GMM application that is created by a security vendor and loaded by the hypervisor-A 116A into the isolated guest memory address space of VM1 118. The code of the GMM module 138 may be run using guest resources of VM1 118 (e.g., the virtual CPU, the virtual memory, etc. of the virtual hardware 130). As explained above, the guest OS 122 running in VM1 118 does not have visibility into the GMM module 138 (e.g., the guest OS 122 and/or other elements of VM1 118 do not know of the existence of the GMM module 138, or may know of the existence of the GMM module 138 but do not have read/write access rights into the memory space where the GMM module 138 resides). Contrastingly according to one embodiment, the GMM module 138 has read/write access into the state of VM1 118 (e.g., the state of the memory, registers, processes, guest OS 122, applications 124, etc. of VM1 118). In some implementations, the GMM module 138 may be provided with such visibility into the state of VM1 118 via the agent 126.

For example, the agent 126 that runs in conjunction with the guest OS 122 is aware of the state of the the memory, registers, processes, applications 124, etc. of VM1 118 and can report this state information to the GMM module 138. Thus, while the GMM module 138 by itself may lack context as to what is executing in VM1 118, the GMM module 138 can be informed of the state information of VM1 118 via the agent 126. Moreover in one embodiment, the agent 126 can make hypercalls to communicate state information to the GMM module 138.

A security program 140 may run on top of or within the hypervisor-A 116A. In the example embodiment of FIG. 1, the security program 140 is depicted as running within or as part of the hypervisor-A 116A. In other embodiments, the security program 140 may run within or may be installed at other locations within the host-A 110A. The security program 140 may be configured in one embodiment to receive alerts from the GMM module 138 about possible malicious code, and to take a remedial action in response to an alert from the GMM module 138. For example, the security program 140 may take remedial actions such as shutting down VM1 118, disabling the guest OS 122, sending a report to a management server 142 so as to enable a system administrator to further evaluate the alert(s) from the GMM module 138, etc. In some embodiments, the GMM module 138 can be part of the security program 140.

Although FIG. 1 shows the security program 140 as a single discrete component, the security program 140 of another embodiment can be implemented using distributed components that include or otherwise work in conjunction with the agent 126, the GMM module 138, and the management server 142.

The management server 142 of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster. The functionalilty of the management server 142 may be accessed via one or more user devices 146 that are operated by a system administrator. For example, the user device 146 may include a web client 148 (such as a browser-based application) that provides a user interface operable by the system administrator to view and evaluate alerts provided by the GMM module 138 to the management server 142. The system administrator may then operate the user interface of the web client 148 to facilitate the implementation of a remedial action, such as shutting down a VM, disabling a guest OS, debugging, troubleshooting, etc.

The management server 142 may be communicatively coupled to host-A 110A . . . host-N 110N (and hence communicatively coupled to the virtual machines, hypervisors, agents, GMM modules, hardware, etc.) via the physical network 112. The host-A 110A host-N 110N may in turn be configured as a datacenter that is managed by the management server 142. In some embodiments, the functionality of the management server 142 may be implemented in any of host-A 110A host-N 110N, instead of being provided as a separate standalone device such as depicted in FIG. 1.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Referring now back to the agent 126 and the GMM module 138, the agent 126 loads very early in the boot sequence of VM1 118 and assumes a root of trust role. As part of the VMI process, the agent 126 then gathers context information about the guest OS 122 and provides this context information to the GMM module 138 using a hyerpcall. The context information may include various kernel data structure offsets, running processes of the kernel of the guest OS 122, system call tables, locations of kernel components (e.g., functions, process lists, module lists, etc.), or other information. The GMM module 138 can then reconcile (e.g., check) this information against information maintained by the GMM module 138, such as a process list maintained by the GMM module 138. For example, the agent 126 may use an application program interface (API) of the guest OS 122 to register a callback function for processes that are created/started/exit. Whenever a process is created/ starts/exits, the callback function is called and makes a hypercall to the GMM module 138 to inform the GMM module 138 of the creation/start/exit of the process. In this manner, the GMM module is able to maintain the process list.

In some situations, it may be desirable for the GMM module 138 to instruct the agent 126 to perform certain actions, via an asynchronous deferred guest call (DGC) or other type of call, and to authoritatively confirm that the agent 126 has indeed executed the DGC. For example, the GMM module 138 may dictate the agent 126 to execute a DGC that causes the agent 126 to use an API of the guest OS 122 to compile a list of running processes in VM1 118, and to then provide the compiled list to the GMM module 138. The GMM module 138 may then correlate that list with a list of live processes maintained by the GMM module 138, and look for mismatches that may indicate the presence of malicious code.

One way to perform the above is to provide a dedicated thread in the agent 126 that causes the agent 126 to periodically make a hypercall to the GMM module 138. The hypercall would ask the GMM module 138 for instructions as to what operation the agent 126 should perform. In response, the GMM module 138 would provide the agent 126 with an action that instructs the agent 126 to compile the list and to report the list back to the GMM module 138.

However, if the VM1 118 has been compromised by malicious code, the malicious code could modify a scheduler of the guest OS 122 such that the dedicated thread in the agent 126 is never scheduled. Moreover, the malicious code could adversely modify the programming of the agent 126 such that the agent 126 does not execute the DGC but nevertheless misleadingly reports to the GMM module 138 that the DGC has been executed/completed.

Accordingly in some embodiments of the virtualized computing environment 100, methods are provided to authoritatively determine whether the agent 126 has executed the DGCs issued by the GMM module 138 and to identify attempts by malicious code to modify the agent 126 and/or its related components. Such methods leverage the feature that while the agent 126, the guest OS 122, and other components of VM1 118 may be potentially vulnerable to malicious code, the GMM module 138 is largely immune from the malicious code (due to the GMM module 138 residing in a secure enclave). In this manner, the GMM module 138 is able to independently and reliably verify whether VM1 118 and its guest OS 122 are operating properly and without the presence of malicious code. Such methods are described in further detail next with respect to FIGS. 2 and 3.

Monitoring for Modification and Execution of Guest Calls

Figure 2:
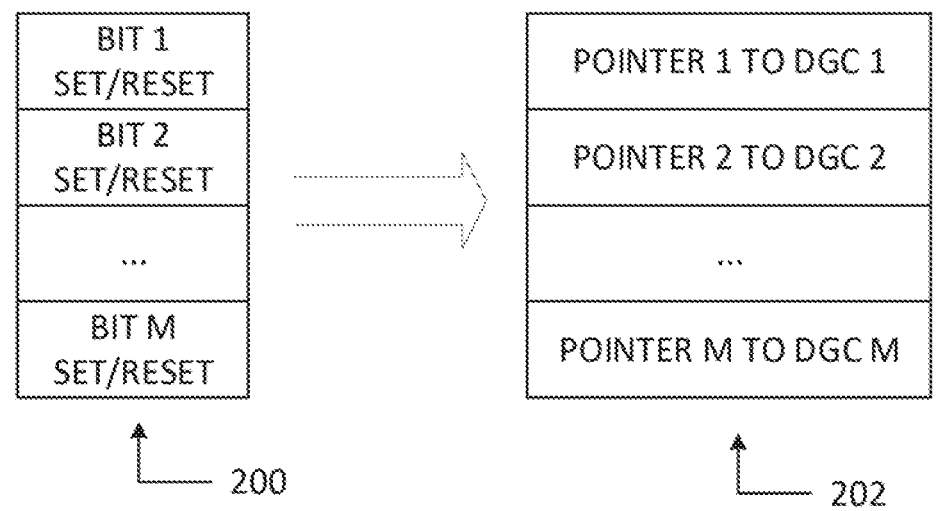
FIG. 2 illustrates an example bit mask that is linked to pointers for associated deferred guest calls and operations in connection with performing VMI in the virtualized computing environment of FIG. 1.
Figure 2:
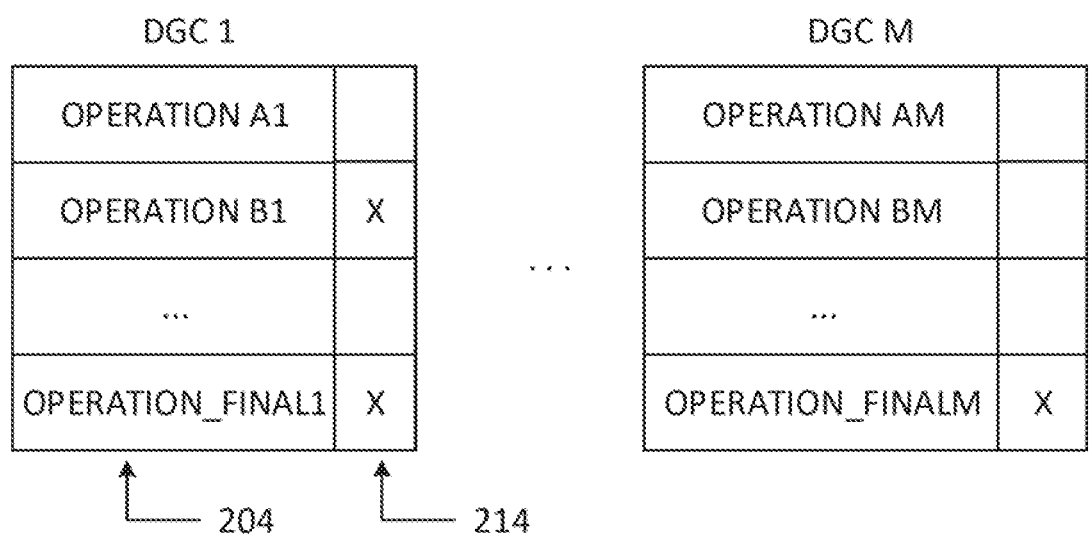

FIG. 2 illustrates an example bit mask 200 that is linked to pointers 202 for associated deferred guest calls and operations 204 in connection with performing VMI in the virtualized computing environment 100 of FIG. 1. The bit mask 200 of one embodiment includes bits (e.g., Bit 1 . . . Bit M, wherein M is an integer greater than or equal to 1) that can be set or reset by the GMM module 138. For instance, a bit can be set to binary 1 and reset/cleared to binary 0. The bit mask 200 is linked to or otherwise associated with an array of the pointers 202 that point to DGCs. For instance, the array may include Pointer 1 . . . Pointer M that each point to or is otherwise associated with a corresponding DGC 1 . . . DGC M. Thus, when a particular Bit X amongst Bit 1 . . . Bit M is set by the GMM module 138, the corresponding DGC X amongst DGC 1 . . . DGC M, which is pointed to by Pointer X of Pointer 1 . . . Pointer M, is identified for execution by the agent 126.

The size of the array of pointers 202 can be set to be the same as the number M of bits in the bit mask 200. Furthermore, the arrangement shown in FIG. 2, wherein the bit mask 200 links to the array of pointers 202, is merely an example. Other methods and configurations may be used to map each of the bits in the bit mask 200 to a corresponding DGC, such that setting a bit in the bit mask 200 by the GMM module 138 is an indication of whether the corresponding DGC should be executed, and resetting the bit by the GMM module 138 is performed when the DGC is confirmed to have been executed.

The DGCs labeled as DGC 1 . . . DGC M each in turn identify or otherwise correspond to a plurality of operations/ functions. For example, DGC 1 may correspond to a subroutine that includes the operations 204 (e.g., Operation A1, Operation B1, . . . , Operation_Final1 shown in FIG. 2), up to DGC M that corresponds to a subroutine that includes Operation AM . . . Operation FinalM. Such subroutines associated with the DGCs may be stored in a virtual memory space of VM1 118, and executed by the agent 126 in cooperation with the guest OS 122.

According to one embodiment, the agent 126 maintains the bit mask 200 and the array of pointers 202 in the virtual memory space of VM1 118. When the agent 126 loads early in the boot sequence of VM1 118 wherein the agent 126 assumes a root of trust role, the agent 126 informs the GMM module 138 of the address(es) in the virtual memory space of VM1 118A and/or in the physical memory space in the storage 134A where the bit mask 200 and array of pointers 202 reside. The GMM module 138 then places write traces on the bit mask 200 and array of pointers 202.

According to one embodiment, a write trace may be implemented by having the GMM module 138 mark a memory address (where each corresponding element of the bit mask 200 and array of pointers 202 reside) as read-only in an extended page table, such that any write operation attempted by an entity (other than the GMM module 138) on the memory address triggers a fault this is reported to or otherwise detected by the GMM module 138, and then the GMM module 138 can trace the source of the write attempt. Examples of write trace techniques are described in U.S. patent application Ser. No. 15/616,935 (published as U.S. Patent Application Publication No. 2018/0267818), entitled "HYPERVISOR-ASSISTED APPROACH FOR LOCATING OPERATING SYSTEM DATA STRUCTURES BASED ON NOTIFICATION DATA," filed on Jun. 8, 2017, which is incorporated herein by reference in its entirety. It is noted that modifications made by the GMM module 138 to the bit mask 200 (such as setting or resetting a bit in the bit mask 200) do not trigger a write trace, since the GMM module 138 is provided with read/write access to the bit mask 200. Further details of the use of write traces to detect potential malicious modifications to the bit mask 200 and the array 210 will be described in further detail with respect to FIG. 3.

Still further in some embodiments, the GMM module 138 places invisible breakpoints or other markers in the subroutines of the DGCs that are not detectable by the agent 126 and/or the guest OS 122. For example and as symbolically depicted in FIG. 2, one or more of the operations 204 of DGC 1 may be marked ("X") as a breakpoint or other execution point 214. The marking may be performed, for instance, by tagging or otherwise identifying memory addresses where the code for the particular operation resides—thus, when such memory addresses are then accessed to execute the code, then the DGC 1 is determined by the GMM module 138 to have been completed at that execution point, and the GMM module 138 may then clear the corresponding bit in the bit mask 200. In the example of FIG. 2, markers have been placed at execution points for Operation B1 and Operation Final, such that the completion of these operations triggers a notification to the GMM module 138. The marker at Operation B1 may be useful to determine that the DGC 1 has been at least partially executed, while in some embodiments, just a single marker at Operation Final may be sufficient to indicate the complete and successful execution of DGC 1.

The markers (e.g., breakpoints) inserted at the execution points 214 are made invisible to the agent 126 and/or the guest OS 122 as a precaution, in the event that one or both of these components may have been compromised by malicious code. Thus, since the markers are invisible to the malicious code, the malicious code would not be able to falsely trigger the markers in order to deceive the GMM module 138 into determining that the operations have been successfully completed.

In one embodiment, a transparent code patching technique may be used to insert the invisible breakpoints in the operational code of the DGCs that may execute as part of the kernel code of the guest OS 122. In an example transparent code patching technique, the GMM module 138 in cooperation with the hypervisor-A 116A can patch or otherwise modify the kernel code of the guest OS 122 (in order to insert the invisible breakpoints and to identify when the breakpoints are triggered), in the presence of kernel patch protection (KPP) software of the guest OS 122 that would otherwise prevent the patching of the kernel code. With such a technique, the GMM module 138 can patch the kernel code in order to enable interception/detection of various events during the execution of the patched code by the guest OS 122 and agent 126, while concurrently rendering the patch undetectable by the KPP software. This capability may be provided by having the GMM module 138 and the hypervisor-A 116A present the patched code of the DGCs in an execution stream for the agent 126 and guest OS 122, while the original (unpatched) code is presented to the KPP software in a data stream. Examples of transparent code patching techniques are described in U.S. patent application Ser. No. 15/643,503 (published as U.S. Patent Application Publication No. 2018/0307516), entitled "TRANSPARENT CODE PATCHING USING A HYPERVISOR," filed on Jul. 7, 2017, which is incorporated herein by reference in its entirety.

Further details of the use of invisible breakpoints/markers (as well as write traces), in connection with the bit mask 200, the array of pointers 202, and the operations 204 of the DGCs, will now be provided with respect to FIG. 3. Specifically, FIG. 3 is a flowchart of an example method 300 for VMI that can be performed in the virtualized computing environment 100 of FIG. 1.

Example method 300 may include one or more operations, functions, or actions illustrated by one or more blocks, such as blocks 302 to 320. The various blocks of the method 300 and/or of any other process(es) described herein may be combined into fewer blocks, divided into additional blocks, supplemented with further blocks, and/or eliminated based upon the desired implementation. In one embodiment, the operations of the method 300 may be performed in a pipelined sequential manner. In other embodiments, some operations may be performed out-of-order, in parallel, etc.

According to one embodiment, the method 300 may be performed by the GMM module 138, which may form part of the security program 140, in cooperation with the agent 126 and the managment server 142. For example, the security program 140 may be controlled by the management server 142, and the security program 140 may in turn control or operate the agent 126 and the GMM module 138.

At a block 302 ("OBTAIN INFORMATION REGARDING BIT MASK AND ARRAY FROM AGENT"), the agent 126 loads in the boot sequence of VM1 118 in a root of trust role, and generates the bit mask 200 and the array of pointers 202. The GMM module 138 obtains, from the agent 126, the location/addresses in memory where the bit mask 200 and array of pointers 202 reside.

The block 302 may be followed by a block 304 ("PUT WRITE TRACE(S) ON BIT MASK AND ARRAY"), where the GMM module 138 inserts one or more write traces into the memory locations where the bit mask 200 and array of pointers 202 reside. In this manner, the GMM module 138 is able to detect any attempts by other entities to modify the contents of the bit mask 200 and the array of pointers 202.

The block 304 may be followed by a block 306 ("INSERT MARKER(S) IN CODE"). Knowing the DGCs that are associated with the bit mask 200 and the array of pointers 202, the GMM module 138 can then insert markers (e.g., invisible breakpoints) in the location(s) of the code of the DGCs that is/are being pointed to.

The block 306 may be followed by a block 308 ("MONITOR BIT MASK AND ARRAY FOR MODIFICATION ATTEMPT") in which the GMM module 138 monitors for attempts by malicious code to modify the bit mask 200 and the array of pointers 202. Possible malicious modification attempts may include, for example, attempts to modify the bit mask 200 and the array of pointers 202 or their contents, falsely set or reset bits in the the bit mask, change pointers in the array of pointers 202, etc.

At a block 310 ("MODIFICATION ATTEMPT DETECTED?"), the GMM module 138 determines whether a modification attempt has been detected. With the use of the write traces, for example, attempts to write to the memory locations of the bit mask 200 and the array 210 will trigger a fault that is detected by the GMM module 138. If a modification attempt is detected ("YES" at the block 310), then the GMM module 138 initiates a remedial action at a block 320 ("INITIATE REMEDIAL ACTION"). Examples of remedial actions can include shutting down or suspending the affected VM, removing the affected VM from the virtualized computing environment 100, and/or sending a message to the management server 142 so as to enable the management server to alert a system administrator to further investigate the modification attempt.

If a modification attempt is not detected ("NO" at the block 310), then the method 300 returns to the block 308 to continue to monitor for modification attempts. Contemporaneously, subsequently, and/or independently from the monitoring performed at the block 308 (as represented by a dashed line and arrow at 311), the GMM module 138 sets one or more bits in the bit mask 200 at a block 312 ("SET BIT(S) IN BIT MASK"). For instance, the GMM 138 may set bits from binary 0 to binary 1, in the bit mask 200, for specific DGCs that the GMM 138 wishes the agent 126 to execute.

The block 312 may be followed by a block 314 ("AGENT MAKES HYPERCALL TO GMM MODULE?), wherein the agent 126 may or may not make a hypercall to the GMM module 138. For example, the agent 126 may make hypercalls ("YES" at the block 314) to the GMM module 138 for various reasons. When the hypercall returns from the GMM module 138, the agent 126 checks the bit mask 200 for bits that may have been set by the GMM module 138 to request execution of the corresponding DGC.

Also in one embodiment, a dedicated thread in the agent 126 may periodically make a hypercall to the GMM module 138 to seek instructions as to what operations (e.g., DGCs) to execute. The GMM 138 may start a timer at the previous block 312 for each respective DGC that has a corresponding bit that was set in the bit mask 200. The timer may have a duration from 1 second to several minutes, for instance, which could correspond to an amount of time that the agent 126 is given to trigger the invisible breakpoint in the execution of the code of the DGC. Furthermore, in a situation where malicious code may have disabled the thread in the agent 126 that is responsible for initiating the hypercall to the GMM module 138 (and therefore the hypercall is never made), the expiration of the timer will indicate the presence of the malicious code. Hence, if the thread has indeed been disabled, the hypercall will not be received by the GMM module 138 ("NO" at the block 314) and the DGC(s) for which the bit(s) were set in the bit mask 200 will not be executed by the expiration of the timer. The GMM module 138 can then initiate remedial action at the block 320.

If, however, agent 126 makes a hypercall to the GMM module 138 at the block 314 ("YES" at the block 314), then the GMM module 138 can monitor for the triggering of the breakpoints during the execution of the code of the DGC, at a block 316 ("MONITOR FOR EXECUTION OF CODE AT MARKER(S)"). For example, when the agent 126 returns from the hypercall, the agent 126 checks the bit mask 200 for any bits that are set, and then determines the DGC(s) corresponding to the set bit(s) and executes the DGC(s) or attempts to execute the DGC(s) within the time allotted by the timer.

The GMM module 138 checks for the execution of the code at a block 318 ("CODE EXECUTED?"). If the GMM module 138 detects that despite the setting of the bit in the bit mask 200 for the DGC, the operations of the DGC are not executed (e.g., the invisible breakpoint is not triggered within the time allotted by the timer, which would correspond to a "NO" at the block 318), then the GMM module 138 considers this situation as possibly involving a hijack by malicious code. The GMM module 138 can then initiate remedial action at the block 320.

If, however, the GMM module 138 determines that the code of the DGC has been executed ("YES" at the block 318), by determining that the invisible breakpoint has been triggered, then the GMM module 138 resets the corresponding bit in the bit mask 200 from binary 1 to binary zero at a block 322 ("RESET BIT(S) IN BIT MASK"). The method 300 then returns to the block 308 where the GMM module 138 monitors for malicious modification and/or to the block 312 to set other bit(s) in the bit mask 200, and the operations in the other blocks thereafter may be repeated in the manner described above.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIG. 3. For example, computing devices capable of acting as host devices may be deployed in virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to identify attempts by malicious code to bypass security mechanisms.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

What is claimed is:

1. A method in a virtualized computing environment to implement guest calls in connection with detection of malicious code, wherein the virtualized computing environment includes a guest monitoring mode (GMM) module and an agent in a guest virtual machine (VM), the method comprising:

obtaining, by the GMM module from the agent, information regarding a bit mask and an array, wherein the array is associated with a plurality of guest calls that are executable by the agent in response to setting of corresponding bits in the bit mask by the GMM module;

using, by the GMM module, the obtained information to insert at least one marker into code of at least one guest call of the plurality of guest calls, wherein the at least one marker identifies an execution point in the code;

setting, by the GMM module, a bit in the bit mask that corresponds to the at least one guest call to instruct the agent to execute the at least one guest call;

monitoring, by the GMM module, for completion of execution of the at least one guest call at the execution point identified by the marker; and in response to a failure to detect the completion of the execution at the execution point, initiating, by the GMM module, a remedial action to address malicious code.

2. The method of claim 1, further comprising placing, by the GMM module, a write trace on the bit mask and the array to detect an attempt by the malicious code to modify the bit mask and the array.

3. The method of claim 2, wherein obtaining the information regarding the bit mask and the array includes obtaining at least one address of a memory location where the bit mask and array reside, and wherein placing the write trace includes putting the write trace on the at least one memory location for detection of an attempt by the malicious code to write into the at least one memory location.

4. The method of claim 1, further comprising:

in response to detection of the completion of the execution at the execution point, clearing, by the GMM module, the corresponding bit in the bit mask that was set.

5. The method of claim 1, wherein initiating the remedial action includes at least one of: shutting down the guest VM, suspending the guest VM, removing the guest VM from the virtualized computing environment, or sending a report to a management server to enable the management server to alert a system administrator to investigate the failure to detect the completion of the execution.

6. The method of claim 1, further comprising setting, by the GMM module, a timer having a duration corresponding to an amount of time for the agent to complete execution at the execution point.

7. The method of claim 6, wherein the failure to detect the completion of the execution at the execution point corresponds to an expiration of the timer.

8. A non-transitory computer-readable medium having instructions stored thereon, which in response to execution by one or more processors, cause the one or more processors to perform or control performance of operations to implement guest calls in connection with detection of malicious code in a virtualized computing environment, wherein the virtualized computing environment includes a guest monitoring mode (GMM) module and an agent in a guest virtual machine (VM), the operations comprising:

obtaining, by the GMM module from the agent, information regarding a bit mask and an array, wherein the array is associated with a plurality of guest calls that are executable by the agent in response to setting of corresponding bits in the bit mask by the GMM module;

using, by the GMM module, the obtained information to insert at least one marker into code of at least one guest call of the plurality of guest calls, wherein the at least one marker identifies an execution point in the code;

setting, by the GMM module, a bit in the bit mask that corresponds to the at least one guest call to instruct the agent to execute the at least one guest call;

monitoring, by the GMM module, for completion of execution of the at least one guest call at the execution point identified by the marker; and in response to a failure to detect the completion of the execution at the execution point, initiating, by the GMM module, a remedial action to address malicious code.

9. The non-transitory computer-readable medium of claim 8, wherein the operations further comprise:
  placing, by the GMM module, a write trace on the bit mask and the array to detect an attempt by the malicious code to modify the bit mask and the array.

10. The non-transitory computer-readable medium of claim 9, wherein obtaining the information regarding the bit mask and the array includes obtaining at least one address of a memory location where the bit mask and array reside, and wherein placing the write trace includes putting the write trace on the at least one memory location for detection of an attempt by the malicious code to write into the at least one memory location.

11. The non-transitory computer-readable medium of claim 8, wherein the operations further comprise:
  in response to detection of the completion of the execution at the execution point, clearing, by the GMM module, the corresponding bit in the bit mask that was set.

12. The non-transitory computer-readable medium of claim 8, wherein initiating the remedial action includes at least one of: shutting down the guest VM, suspending the guest VM, removing the guest VM from the virtualized computing environment, or sending a report to a management server to enable the management server to alert a system administrator to investigate the failure to detect the completion of the execution.

13. The non-transitory computer-readable medium of claim 8, wherein the operations further comprise:
  setting, by the GMM module, a timer having a duration corresponding to an amount of time for the agent to complete execution at the execution point.

14. The non-transitory computer-readable medium of claim 13, wherein the failure to detect the completion of the execution at the execution point corresponds to an expiration of the timer.

15. A host in a virtualized computing environment, the host comprising:
  a processor; and
  a non-transitory computer-readable medium coupled to the processor and having stored instructions stored thereon, which in response to execution by the processor, provide a guest monitoring mode (GMM) module and an agent in a guest virtual machine (VM),
  wherein the instructions, further in response to execution by the processor, cause the processor to perform or control performance of operations to implement guest calls in connection with detection of malicious code in the virtualized computing environment, and wherein the operations include:
    obtain, by the GMM module from the agent, information regarding a bit mask and an array, wherein the array is associated with a plurality of guest calls that are executable by the agent in response to setting of corresponding bits in the bit mask by the GMM module;
    use, by the GMM module, the obtained information to insert at least one marker into code of at least one guest call of the plurality of guest calls, wherein the at least one marker identifies an execution point in the code;
    setting, by the GMM module, a bit in the bit mask that corresponds to the at least one guest call to instruct the agent to execute the at least one guest call;
    monitor, by the GMM module, for completion of execution of the at least one guest call at the execution point identified by the marker; and
    in response to a failure to detect the completion of the execution at the execution point, initiate, by the GMM module, a remedial action to address malicious code.

16. The host of claim 15, wherein the operations further comprise:
  place, by the GMM module, a write trace on the bit mask and the array to detect an attempt by the malicious code to modify the bit mask and the array.

17. The host of claim 16, wherein the operation to obtain the information regarding the bit mask and the array includes an operation to obtain at least one address of a memory location where the bit mask and array reside, and wherein the operation to place the write trace includes an operation to put the write trace on the at least one memory location for detection of an attempt by the malicious code to write into the at least one memory location.

18. The host of claim 15, wherein the operations further comprise:
  in response to detection of the completion of the execution at the execution point, clear, by the GMM module, the corresponding bit in the bit mask that was set.

19. The host of claim 15, wherein the operation to initiate the remedial action includes an operation to at least one of: shut down the guest VM, suspend the guest VM, remove the guest VM from the virtualized computing environment, or send a report to a management server to enable the management server to alert a system administrator to investigate the failure to detect the completion of the execution.

20. The host of claim 15, wherein the operations further comprise:
  set, by the GMM module, a timer having a duration corresponding to an amount of time for the agent to complete execution at the execution point.

21. The host of claim 20, wherein the failure to detect the completion of the execution at the execution point corresponds to an expiration of the timer.

* * * * *